United States Patent [19]

Kurihara et al.

[11] 4,247,938

[45] Jan. 27, 1981

[54] METHOD FOR GENERATING A PSEUDO-SIGNAL IN AN ERROR RATE SUPERVISORY UNIT AND CIRCUIT FOR CARRYING OUT THE SAME

[75] Inventors: Hiroshi Kurihara, Tokyo; Tadayoshi Katoh, Kawasaki; Sadao Takenaka, Yokohama, all of Japan

[73] Assignee: Fujitsu Limited, Kawasaki, Japan

[21] Appl. No.: 40,408

[22] Filed: May 18, 1979

[30] Foreign Application Priority Data

May 23, 1978 [JP] Japan ................... 53-61835

[51] Int. Cl.$^3$ ............... H04B 17/00; G06F 11/00
[52] U.S. Cl. ........................ 371/5; 375/34; 375/57; 371/64
[58] Field of Search ............. 371/5, 22, 64; 375/10, 375/34, 58, 99; 455/63, 67, 296; 328/162, 164

[56] References Cited

U.S. PATENT DOCUMENTS

| | | | |
|---|---|---|---|
| 3,665,394 | 5/1972 | Lender et al. | 371/5 |
| 3,689,884 | 9/1972 | Tew, Jr. | 371/5 |
| 3,721,959 | 3/1973 | George | 371/5 |
| 4,034,340 | 7/1977 | Sant'Agostino | 375/10 |

OTHER PUBLICATIONS

Gooding, Performance Monitor Techniques for Digital Receivers Based on Extrapolation of Error Rate, IEEE Trans. on Comm. Tech., vol. Com-16, No. 3, Jun. 1968, pp. 380-387.

*Primary Examiner*—Charles E. Atkinson
*Attorney, Agent, or Firm*—Staas & Halsey

[57] ABSTRACT

A method and circuit for generating a pseudo-error signal comprising a demodulator circuit for demodulating an input signal; a first discriminator circuit for regenerating a first digital data signal by discriminating the output of the demodulator circuit; a noise extracting means for extracting a noise component from the input signal; an adding circuit for adding the output of the noise extracting means and the output of the demodulator circuit; a second discriminator circuit for regenerating a second digital data signal by discriminating the output of the adding circuit, and; an exclusive OR circuit for recognizing whether or not the first digital data signal coincides with the second digital data signal.

19 Claims, 18 Drawing Figures

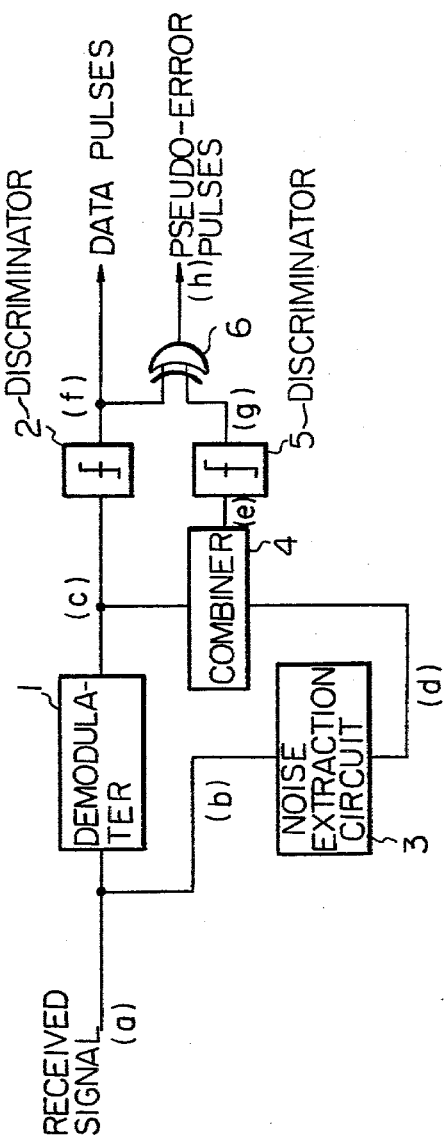

Fig. 2A (a) (b) 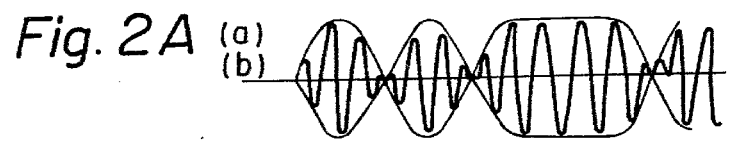

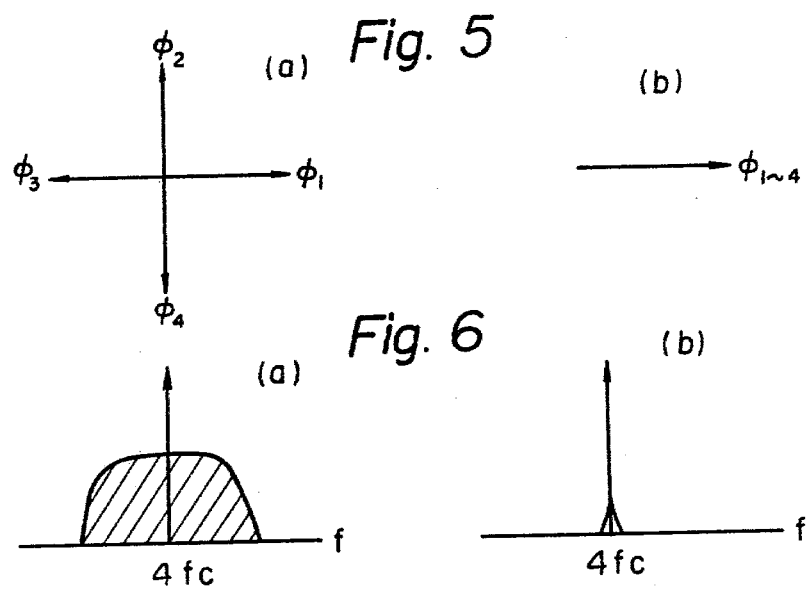
Fig. 5
Fig. 6
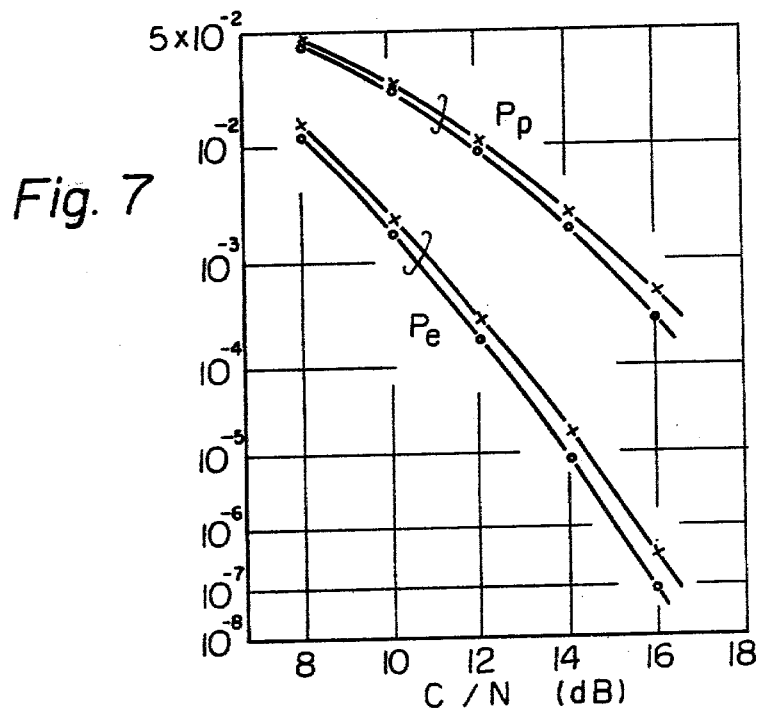
Fig. 7

METHOD FOR GENERATING A PSEUDO-SIGNAL IN AN ERROR RATE SUPERVISORY UNIT AND CIRCUIT FOR CARRYING OUT THE SAME

BACKGROUND OF THE INVENTION

1. Field of the Invention

The present invention relates to a method and an apparatus for generating a pseudo-error signal in an error rate supervisory unit which is used in a carrier wave digital modulation system, especially in a receiving unit used in an m phase PSK communication system or in a receiving unit used in a multi level QAM communication system.

2. Description of the Prior Art

The circuit quality of a PCM communication system is estimated by the error rate of a series of signal pulses. This error rate can be obtained by dividing a number of error bits generated within a predetermined time by the total number of signal pulses which are sent. If this error rate is monitored, maintenance of the circuit quality can be carried out very effectively.

In an apparatus for supervising the error rate, the following conditions are required:
 (i) The error rate which is measured in the error rate supervisory apparatus must correspond precisely to a true error rate in a traffic path.
 (ii) The measurement of the error rate must not effect the traffic path.
 (iii) The measurement of the error rate must be carried out rapidly.
 (iv) The measurement of the error rate must be carried out without changing data which are transmitted in the system.
 (v) The construction of the supervisory apparatus must be simple and the cost of manufacture of the apparatus must be low.

Of the above-mentioned conditions, condition (iii) is very important. As the value of the error rate in the circuit is usually very small, a long time period would normally be required to obtain a precise error rate with few error bits. Therefore, a pseudo-error rate is actually measured by increasing the number of error bits artificially, and the true error bits are determined by measuring the pseudo-error rate, so that the time required for measuring the error rate is decreased.

Conventional methods for generating a pseudo-error signal are disclosed, for example, in the article by M. Keelty, entitled Pseudo-Error Detection Theory and Applications in QPSK 1.5 Mbps Data above FDM Voice Systems, NTC'77, pp 43:4-1~6, and the article by C. R. Hogge, entitled Performance Monitoring of a Digital Radio by Pseudo-Error Detection, NTC'77 pp 43:3-1~3. The prior art can be sumarized as follows:
 (a) A pseudo-error region is provided in a phase surface of a signal vector, and when a received signal enters into the pseudo-error region due to noise, the signal entered into the pseudo-error region is treated as a pseudo-error.
 (b) A phase of eye pattern discriminating clock pulses is shifted from an optimum point, and a discriminating regeneration pulse having an increased error rate is obtained. This regenerated discrimination pulse having an increased error rate is compared with the regenerated discrimination pulse obtained by using a discriminating clock pulse positioned at the optimum point. If the polarities of both regenerated discriminating pulses do not coincide, the pulses are treated as pseudo-error.
 (c) A level of an eye pattern discriminating threshold value is shifted from an optimum level, and a discriminating regeneration pulse having an increased error rate is obtained. This regenerated discrimination pulse, having an increased error rate, is compared with the regenerated discrimination pulse obtained by using a discriminating threshold value positioned at the optimum point. If the polarities of both regenerated discriminating pulses do not coincide, the pulses are treated as pseudo-errors.
 (d) Demodulated output data obtained by using a receiving filter having a very narrow bandwidth, so as to obtain the minimum error rate, is compared with other demodulator output data obtained by using a receiving filter having a wider bandwidth, for the purpose of increasing thermal noise. If the polarities of both sets of demodulated output data do not coincide, the pulses are treated as pseudo-errors.

In the method (a), (b) and (c), mentioned above, when the phase error of the reference carrier increases, the error rate of the system for extracting the pseudo-error increases more than the error rate (the true error rate) in the system which transmits the information. Therefore, the corresponding relation between the pseudo-error rate and the true error rate is spoiled, and the true error rate can not be estimated precisely from the pseudo-error rate. In the method (d), there is no such drawback. However, as the receiving filter has a wider bandwidth, the effect of the interference between channels is increased, so that a precise determination of the true error rate can not be obtained.

SUMMARY OF THE INVENTION

An object of the present invention is to provide a method and apparatus for generating a pseudo-error signal in such a condition that the corresponding relation between the true error rate and the pseudo-error rate is insensitive to parameters of the demodulator such as phase error of the reference carrier.

For the purpose of achieving the above-mentioned object, the method for generating a pseudo-error signal comprises the steps of: regenerating first digital data by discriminating a base band signal which is regenerated by demodulating an input signal; extracting a noise component from the input signal; adding the noise component and the base band signal and, thereby, regenerating second digital data by discriminating the added signal, and; recognizing whether or not the first digital data coincides with the second digital data, so that a pseudo-error signal is generated.

Furthermore, for the purpose of achieving the above-mentioned object, the circuit for the pseudo-error signal comprises: a demodulator circuit for demodulating an input signal; a first discrimination circuit for regenerating first digital data by discriminating the output of the demodulator circuit; a noise extracting means for extracting a noise component from the input signal; an adding circuit for adding the output of the noise extracting means and the output of the demodulator circuit; a second discrimination circuit for regenerating second digital data by discriminating the output of the adding circuit, and; an exclusive OR circuit for recognizing whether or not the first digital data coincides with the second digital data.

Further features and advantages of the present invention will be apparent from the ensuing description with reference to the accompanying drawings to which, however, the scope of the invention is in no way limited.

BRIEF DESCRIPTION OF THE DRAWINGS

FIGS. 1A and 1B illustrate a basic circuit for generating a pseudo-error signal according to the present invention;

FIGS. 2A through 2G illustrate signal waveforms obtained in essential parts of the basic circuit illustrated in FIG. 1A;

FIG. 5 illustrates vector diagrams of signals in the circuit illustrated in FIG. 4;

FIG. 6 illustrates spectrums of signals in the circuit illustrated in FIG. 4;

FIG. 7 is a diagram illustrating the pseudo-error curves and true-error curves of the circuit illustrated in FIG. 4;

DETAILED DESCRIPTION OF THE PREFERRED EMBODIMENT

Figure 1B:
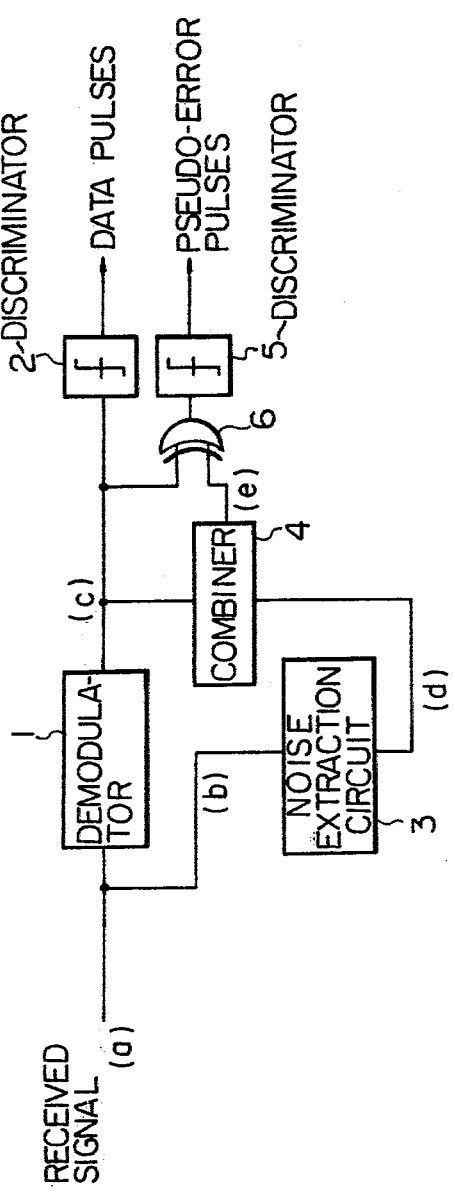

FIG. 1A illustrates a basic circuit used for the method according to the present invention. Referring to FIG. 1A, a received signal (a) is supplied to a demodulator 1, and the output (c) of the demodulator 1 is supplied to a discriminator 2. On the other hand, a signal (b), which is branched from the received signal (a), is supplied to a noise extraction circuit 3, the output (d) of the noise extraction circuit 3 is supplied to a combiner 4 wherein the output (d) of the circuit 3 and the output (c) of the demodulator 1 are added, and the added output (e) is supplied to a discriminator 5. The output (f) of the discriminator 2 is received as a data pulse. On the other hand, the output (f) of the discriminator 2 and the output (g) of the discriminator 5 are compared in an exclusive OR circuit 6, so that a pseudo-error signal is obtained. Waveforms of the signals in the circuit illustrated in FIG. 1 are illustrated in FIGS. 2A through 2G.

Figure 2B:
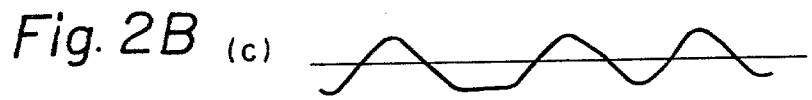
Figure 2C:
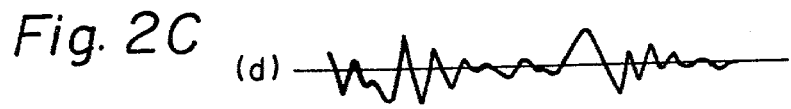
Figure 2D:
Figure 2E:
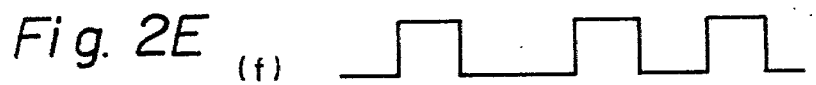
Figure 2F:
Figure 2G:

FIG. 2A illustrates the received input signal (a) and also the signal (b) branched from the input signal (a), FIG. 2B illustrates a baseband signal after demodulation; FIG. 2C illustrates the output (d) of the noise extraction circuit 3, that is, the noise signal which is extracted from the received signal and which is amplified, and; FIG. 2D illustrates the added signal (e) of the output (c) of the demodulator 1 and the noise signal (d). When the output (c) of the demodulator 1 is discriminated by the discriminator 2, a data pulse (f) as shown in FIG. 2E is obtained, and; when the output (e) of the combiner 4 is discriminated by the discriminator 5, the data pulse (g) as shown in FIG. 2F is obtained. When the data pulses (f) and (g) are compared in the exclusive OR circuit 6, a pseudo-error signal (h) as shown in FIG. 2G can be obtained.

Figure 3:
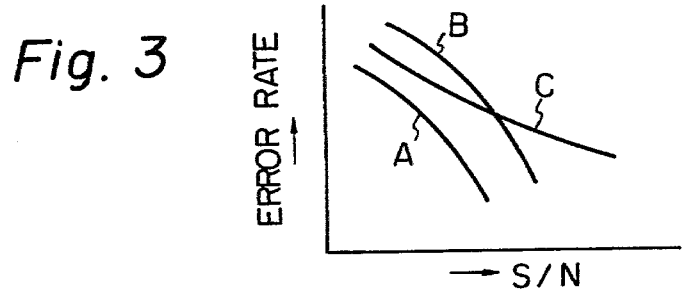
FIG. 3 illustrates characterstics of the error rate measuring circuits for generating a pseudo-error signal according to the prior art and the present invention.

FIG. 3 is one example of the measurement of the pseudo-error rate by using the circuit illustrated in FIG. 1A. Referring to FIG. 3, a curve "A" illustrates the true error rate and a curve "B" illustrates the pseudo-error rate which is obtained by using the circuit illustrated in FIG. 1A. It should be noted that the curve "B" precisely corresponds to the curve "A". A curve "C" illustrates the pseudo-error rate when it is assumed that the noise level supplied to the combiner 4 is constant. The curve "C" varies and saturates in accordance with the signal to noise ratio S/N. This means that the signal to noise ratio of the demodulator input signal is not proportional to that of the combiner 4, because the noise power added to the demodulator output is constant. FIG. 3 clearly shows the characteristic feature of the present invention. FIG. 1B is another basic circuit used for the method according to the present invention. In this circuit, an output (e) of the combiner 4 and output (c) of the demodulator 1 are compared in the exclusive OR circuit 6, that and then an output of exclusive OR circuit 6 is supplied to a discriminator 5.

Next, we will explain the present invention referring to several embodiments.

Figure 4:
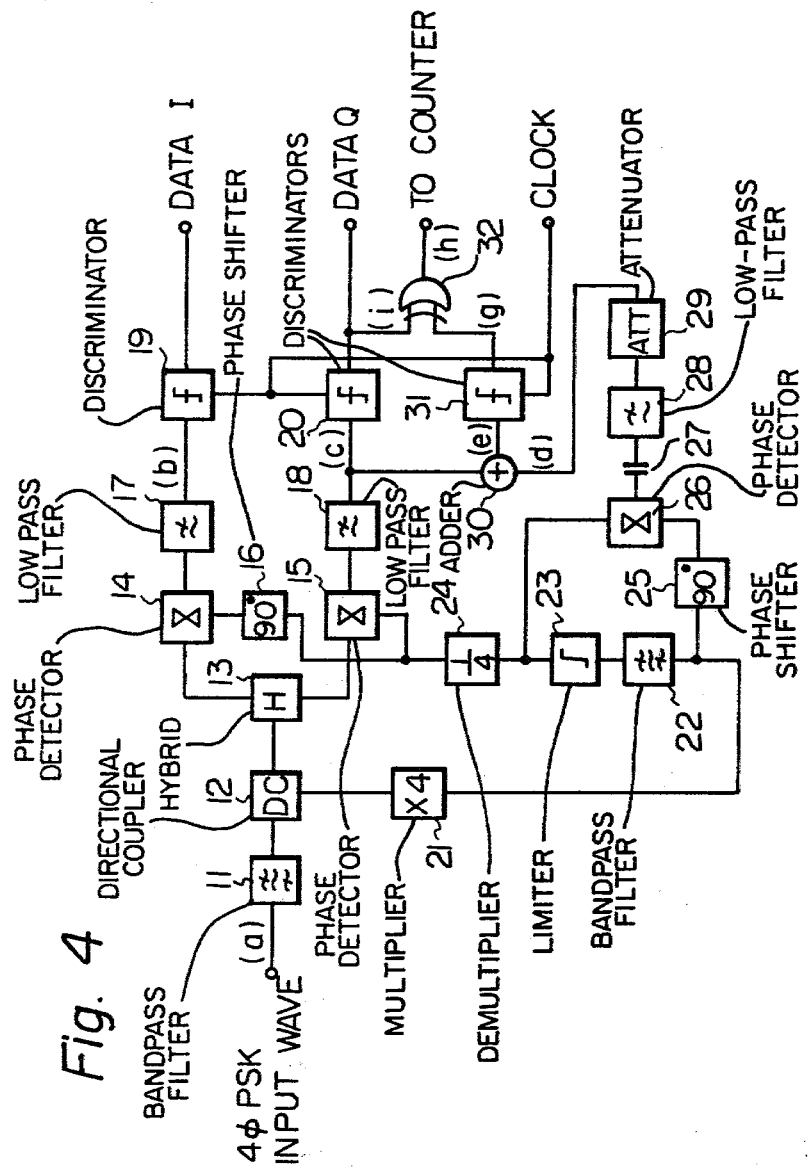
FIG. 4 illustrates a first embodiment of the circuit according to the present invention.

FIG. 4 illustrates the circuit according to the first embodiment of the present invention. In FIG. 4, a four phase PSK wave is used, and the pseudo-error signal generating circuit is included in the demodulating system of the m phase PSK communication system. A portion including reference numerals 11 through 20 is a main pass demodulator, a portion including reference numerals 21 through 24 is a carrier wave regenerative circuit for generating a reference carrier wave, and a portion including reference numerals 25 through 32 is a circuit portion for generating a pseudo-error signal according to the present invention.

The bandwidth of the received four phase PSK wave (a) is filtered by a band pass filter 11 and the output of the band pass filter is supplied to a directional coupler 12. One output of the directional coupler 12 is branched by a hybrid 13. The outputs of the hybrid 13 are demodulated by phase detectors 14 and 15, so that two sequences of the baseband signals are supplied from the outputs of the phase detectors 14 and 15. These two baseband signals are respectively supplied, via low pass filters 17 and 18, to discrimination circuits 19 and 20, and the outputs of the discrimination circuits are obtained as the data outputs I and Q.

On the other hand, a part of the four phase PSK wave (a) which is branched by the directional coupler 12 is multiplied four times by the multiplier 21 and the output of the multiplier 21 is supplied to a narrow band pass filter 22, where a noise component of the input signal is removed. The output of the narrow band pass filter 22 is supplied, via a limiter 23, to a demultiplier 24, where the frequency of the signal is divided by four, so that a regenerative carrier wave having a monospectrum is obtained, and this carrier wave is applied to the phase detectors 14 and 15 as a reference carrier wave.

In the pseudo-error signal generating circuit according to the present invention, the noise component which is extracted from the output of the multiplier 21 and the demodulated base band signal are utilized.

The extraction of the noise component according to the present invention can be carried out easily by using a part of the carrier wave regeneration circuit. That is, a part of the four phase PSK wave (a) extracted from the directional coupler 12 is multiplied by the multiplier 21 and the multiplied carrier wave is obtained. This multiplied carrier wave includes a component which is proportional to the noise component of the input signal. The phases of each signal vector of the four phase PSK wave are arranged with phase differences of 90° as shown in FIG. 5(a), and by multiplying the frequency of the carrier wave four times, the multiplied carrier waves having the same phase as shown in FIG. 5(b) are obtained. The spectrum of the multiplied carrier wave has a noise component which has a substantially symmetrical distribution with a center of the multiplied carrier wave $4fc$, and when the noise component of the input four phase PSK carrier wave varies, the noise component of the multiplied carrier wave also varies. In the noise component, the component due to pattern jitter is included. However, the noise component due to pattern jitter does not effect the circuit for obtaining the pseudo-error rate.

In the circuit according to the present invention, the multiplied carrier wave including the noise component is supplied to a 90° phase shifter 25, and also is supplied, via a narrow bandwidth filter 22, to a limiter 23. The output of the limiter 23, including no noise component, and the output of the 90° phase shifter 25 are supplied to a phase detector 26, where the signals are synchronously detected and the output of the synchronous detector is supplied, via a condenser or capacitor 27, a filter 28 and an attenuator 29, to an adder 30. The input of the adder is only the noise component (d), and includes no carrier wave component, as shown in FIG. 2C. The condenser 27 is used for removing leakage of a direct current component of the carrier wave and the low pass filter is used for removing an undesired wave, such as a higher harmonic component which is generated after the phase detection of the carrier wave, a timing component and a pattern jitter component.

The noise component (d) and the demodulated baseband signal (c) are added in the adder 30, and the baseband signal, (e) including the noise component as shown in 2D, are obtained at the output of the adder 30. The noise component (d) and the demodulated baseband signal (b) may be added for the purpose of obtaining the baseband signal including the noise component. This baseband signal (e) is discriminated by a discriminator 31, as shown in FIG. 2F. The error rate in the discriminated pulse signal (g) is large. This discriminated pulse signal (g) and the output (i) of the discriminator 20 are compared in the exclusive OR circuit 32 and a pseudo-error signal (h) is obtained.

When the pseudo-error signal (h) is converted into an RZ code signal and the converted RZ code signal is supplied to a counter, the pseudo-error rate is obtained.

FIG. 7 illustrates one example of the error rate curves measured in the circuit according to the present invention. Referring to FIG. 7, the ordinate denotes the error rate, the abscissa denotes the carrier to noise ratio, Pe is the bit error rate of the data I and Q measured by using the error rate test circuit, and Pp is the bit error rate of pseudo-error pulse signal (b) measured by using the circuit according to the present invention. In FIG. 7, the mark "o" indicates the value when the phase of the reference carrier waves is not shifted and the mark "x" indicates the value when the phase of the reference carrier wave is shifted by $+5°$.

As illustrated in FIG. 7, pseudo-error rate $P_p$ is magnified by $10^1 \sim 10^4$ with respect to the true error rate Pe of the actual circuit and the large pseudo-error rate $P_p$ is obtained even if the true error rate Pe is small. Therefore, a measurement can be carried out in a short time. The magnifying factor of the error rate can be adjusted by varying the value of the variable attenuator 29.

Further, in the present invention, the pseudo-error rate $P_p$ corresponds faithfully to the true error rate in the actual circuit. Therefore, when a table showing the relation between the pseudo-error rate $P_p$ and the true error rate Pe in the actual line is provided, the true error rate Pe can be estimated from the table.

Figure 8:
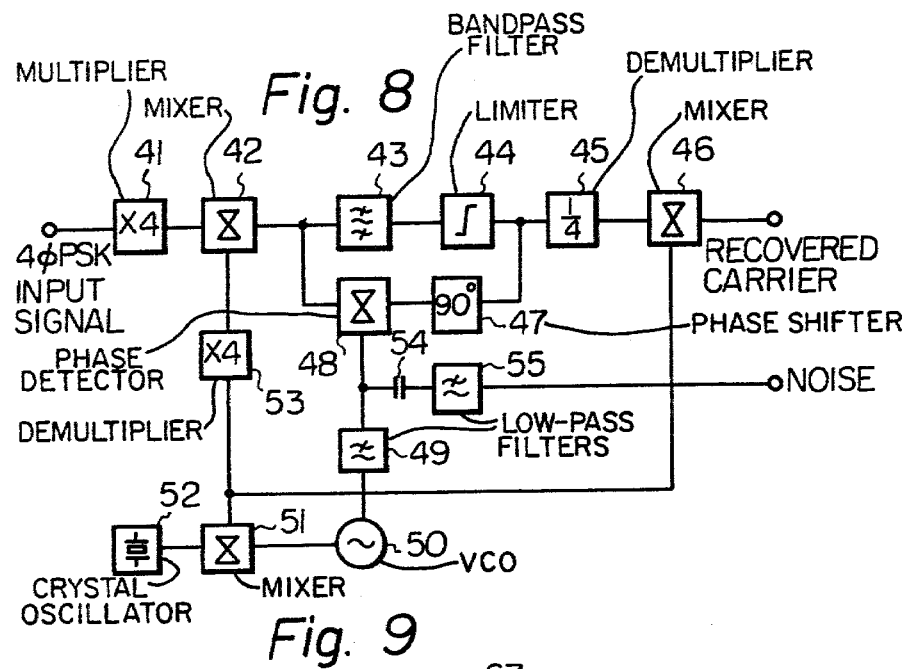
FIG. 8 illustrates a second embodiment of the circuit according to the present invention.

FIG. 8 illustrates the circuit of the second embodiment according to the present invention. In the circuit illustrated in FIG. 8, the noise component is extracted by using a carrier wave regeneration circuit having an automatic frequency control circuit. That is, a four phase PSK signal wave is multiplied by a multiplier 41 and the multiplied signal wave is converted in a mixer 42 to a frequency which concides with a center frequency of the narrow band filter 43. Next, the output of the mixer 42 is applied via a limiter 44 and a demultiplier 45 to a mixer 46, and the output including no noise component is obtained at the output of the mixer 46.

An automatic frequency control loop includes a 90° phase shifter 47, a phase detector 48, a low pass filter 49, a voltage controlled oscillator 50, a crystal oscillator 52, a mixer 51 and a multiplier 53. When the frequency of the four phase PSK carrier wave varies and the converted frequency is shifted from the center frequency of the narrow band pass filter, the automatic frequency control loop detects the difference between the input and the output of the narrow band pass filter, and the frequency control loop controls the voltage controlled oscillator 50 so that the converted frequency always coincides with the center frequency of the narrow band pass filter. By using the automatic frequency control loop, a regenerated carrier wave having a constant phase can be obtained.

In the present invention, the noise component is obtained via the condenser 54 and the low pass filter 55 from the automatic frequency control signal at the output of the phase detector 48. Therefore, the circuit for generating the pseudo-error signal is simple in construction.

In the above explanation, the circuit for generating the pseudo-error signal in the four phase PSK system is described. It should be understood, however, that the circuit according to the present invention can be extended to an "m" phase PSK system.

Figure 9:
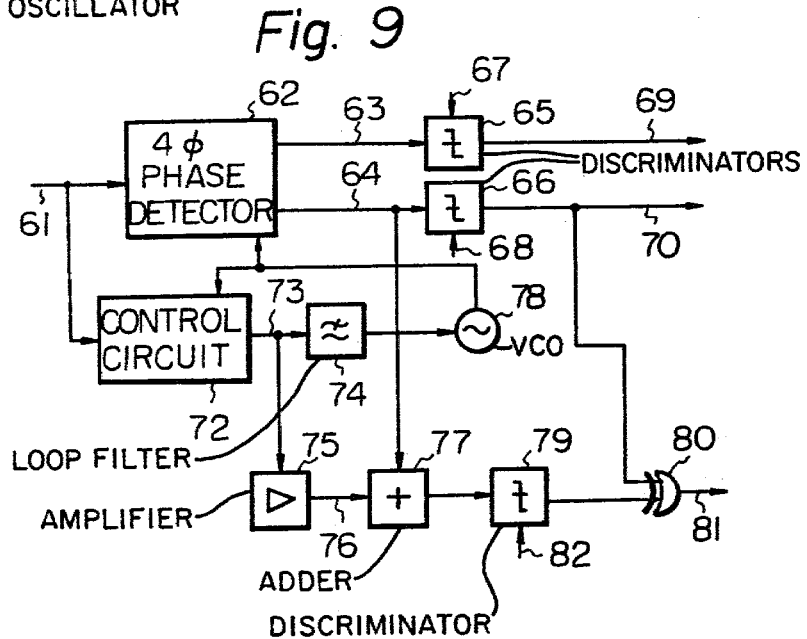
FIG. 9 illustrates a third embodiment of the circuit according to the present invention.

FIG. 9 illustrates the circuit of the third embodiment according to the present invention. In the circuit of FIG. 9, the phase of the four phase PSK modulated wave, which is received in a line 61, is detected by a four $\phi$ phase detector 62, and baseband signals are supplied to trafic busses 63 and 64. These baseband signals are discriminated by discriminators 65 and 66, respectively, and digital data are obtained on output lines 69 and 70. Clock pulse signals are supplied via lines 67 and 68 to the discriminators 65 and 66.

In FIG. 9, a carrier wave regeneration circuit includes a control circuit 72, a loop filter 74 and a voltage controlled oscillator 78. The modulated wave is received from the input line 61, a carrier wave having same frequency as the modulated wave is regenerated and the regenerated carrier wave is supplied to the four $\phi$ phase detector 62. The control circuit 72 generates a voltage signal which is proportional to the phase difference between the received carrier wave and the regenerated carrier wave or which is proportional to sine $\theta$ (wherein θ is the phase difference). The control circuit 72 is constructed using conventional circuits, such as a reverse modulation circuit, a re-modulation circuit, a decision feedback circuit and a COSTAS circuit. The error voltage generated in the control circuit 72 is applied to the voltage controlled oscillator 78, as the control voltage, after the noise of said error voltage is removed by the loop filter 74, so that the voltage controlled oscillator generates a carrier wave having a frequency corresponding to the control voltage.

The amplifier 75 amplifies the noise component appearing at the output line 73 of the control circuit 72. The noise component appearing at the output of the amplifier 75 is applied to one input of an adder 77, and the base band signal appearing on the trafic buss 64 is applied to another input of the adder 77. The output of the adder 77, that is, the base band signal being added the noise component, is discriminated by a discriminator 79. A clock pulse signal is supplied via a line 82 to the discriminator 79.

In the circuit illustrated in FIG. 9, the output data of the discriminator 66 and the output data of the discriminator 79 are the same unless a noise component is added. However, as the noise signal is supplied from the amplifier 75, via the adder 77, to the discriminator 79, the error rate of the output data of the discriminator 79 is larger than that of the output data of the discriminator 66. The two outputs of discriminators 66 and 79 are applied to both inputs of an exclusive OR circuit 80. If the two outputs do not coincide, an output signal is obtained at a line 81.

As already mentioned, the control circuit 72 in the carrier wave regeneration circuit generates on the output line 73 the signal which corresponds to the phase difference between the modulated wave in the line 61 and the carrier wave on the voltage controlled oscillator 78. Therefore, the signal on the output line 73 includes a direct current component corresponding to the above mentioned phase difference and a noise component which is proportional to a noise or a distortion included in the carrier wave on the input line 61. The carrier wave regenerated by the voltage controlled oscillator includes neither noise nor distortion.

Therefore, the input signal to the discriminator 79 includes a base band signal and a noise component proportional to the noise and the distortion on the input line 61. Therefore, the error rate of the output data of the discriminator 79 increases when the noise and the distortion of the signal on the input line 61 increases. Further, the error rate of the output data of the discriminator 66 also increases when the noise and the distortion of the signal on the input line 61 increases. Accordingly, the error rates of the output data of the discriminators 66 and 79 always have correlating relationships.

When the error is generated in the data pulse, the output of the exclusive OR circuit 80 is a binary value "1". This value is counted by a counter (not shown in the drawings) within a predetermined time and the counted value is stored in a read only memory (not shown in the drawings). As the read only memory stores the true error rate corresponding to the counted value, the true error rate can be obtained from the counted value.

Figure 10:
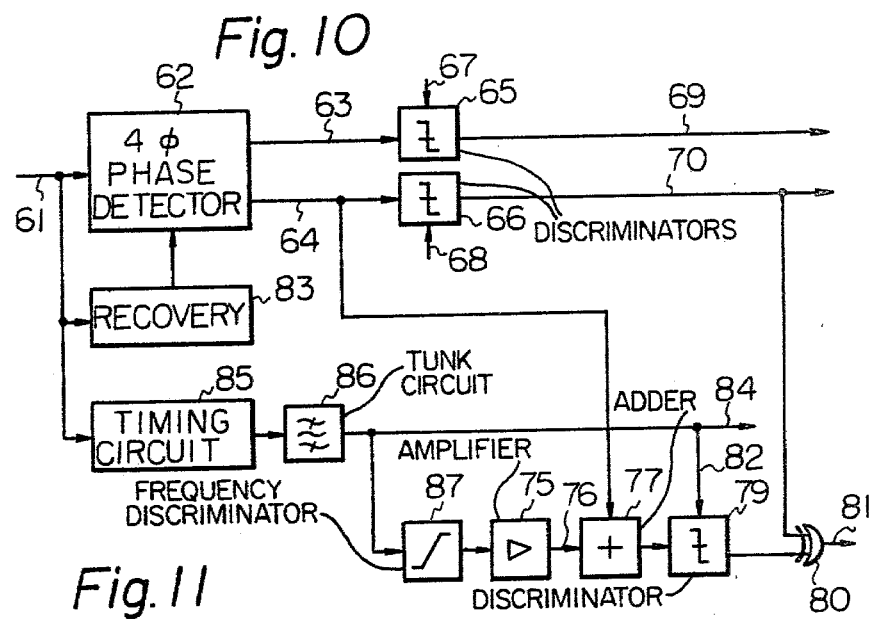
FIG. 10 illustrates a fourth embodiment of the circuit according to the present invention.

FIG. 10 illustrates the circuit of the fourth embodiment according to the present invention. In FIG. 10, reference numerals 61 through 70, 75 through 77, 79 through 81 denote the same elements as the same reference numeral in FIG. 9. Reference numerals 83 is a carrier wave regeneration circuit having the same construction as shown in FIG. 9. Reference numeral 85 denotes a timing extraction circuit for extracting timing bits from the input modulated wave. The extracted bit timing component is supplied via a tunk circuit 86, which has a function of a filter, to the line 84 as a timing signal. The timing signal is applied to a frequency discriminator 87, where the jitter component is detected. The detected jitter component is amplified by an amplifier 75 and is applied to one input of the adder 77.

The jitter component of the timing signal extracted from the input modulated wave increases when the input noise increases. Therefore, it will be understood that the jitter component can be used instead of the noise component in the embodiment illustrated in FIG. 9.

Figure 11:
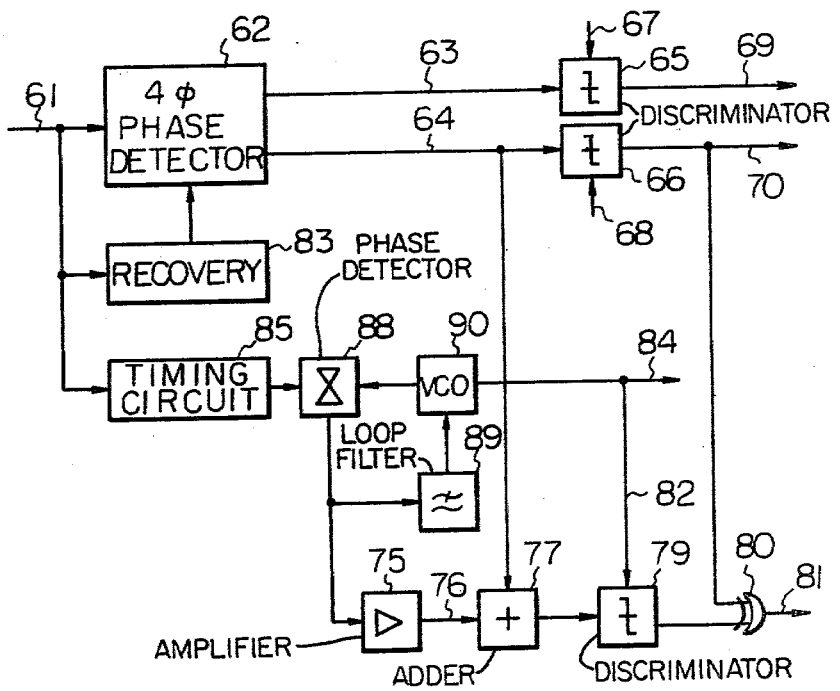
FIG. 11 illustrates a fifth embodiment of the circuit according to the present invention.

FIG. 11 illustrates the circuit of the fifth embodiment according to the present invention. In FIG. 11, reference numerals 61 through 70, 75 though 77, 79 through 85 denote the same elements as the same reference numerals in FIG. 10. Referring to FIG. 11, a timing bit, which is extracted by the timing circuit 85, is applied to a timing signal regeneration circuit, which includes a phase detector 88, a loop filter 89 and a voltage controlled oscillator 90. A phase difference signal, that is, the output of the phase detector 88, includes a noise component included in the timing component which is supplied from the timing circuit 85, in addition to a direct current component corresponding to the phase difference. The timing signal regenerated in the voltage controlled oscillator includes no noise component. The noise component in the output of the phase detector 88 is applied, via an amplifier 75, to an adder 77. After that the same process as mentioned above is carried out and a pseudo-error signal is obtained on the output line 81.

As mentioned above, according to the circuit for generating a pseduo-error signal of the present invention, even if the parameters of the demodulator vary, the relative relation between the true error rate and the pseudo-error rate does not vary. Therefore, the correct true error rate can be monitored by measuring the pseudo-error rate.

Further, the value of the pseudo-error rate can be increased, so that the time for the measurement of the pseudo-error rate can be considerably decreased. Therefore, the present invention is very effective when used in a Time Division Multiplex communication system which has a low bit rate or which transmits and receives short data as burst signals.

What is claimed is:

1. A method for generating a pseudo-error signal from a received input signal comprising the steps of:
   demodulating the input signal to obtain a demodulated input signal;
   extracting a noise component from said input signal;
   adding said noise component and said demodulated input signal to obtain an added signal;
   providing a pseudo-error signal in dependence upon whether or not said demodulated input signal coincides with said added signal.

2. A method for generating a pseudo-error signal according to claim 1, wherein said noise component is extracted simultaneous with the regeneration of a carrier wave for use in demodulating said input signal.

3. A method for generating a pseudo-error signal according to claim 1, wherein said noise component is obtained by extracting a timing component from said input signal.

4. A method for generating a pseudo-error signal according to claim 1, further comprising the step of altering the amplitude of said noise component before adding said noise component to said demodulated input signal.

5. A circuit for generating a pseudo-error signal when an input signal is received, comprising:
- a demodulator circuit for demodulating the input signal to provide a demodulated signal;
- a noise extracting means for extracting a noise component from the input signal;
- an adding circuit, operatively connected to said demodulator circuit and said noise extracting means, for adding said noise component and said demodulated signal;
- an exclusive OR circuit, operatively connected to said demodulator circuit and said adding circuit, for providing a pseudo-error signal when said added signal does not coincide with said demodulated signal.

6. A circuit for generating a pseudo-error signal according to claim 5, further comprising a first means, operatively connected between said noise extracting means and said adding circuit for modifying the amplitude of said noise component.

7. A circuit for generating a pseudo-error signal according to claim 5, wherein the input signal is an m phase input wave, wherein m is a positive integer, and wherein said noise extracting means comprises:
- a multiplier circuit for multiplying by "m" the frequency of the received m phase input wave;
- a narrow band filter, operatively connected to said multiplier circuit for filtering said noise component from the output of said multiplier circuit;
- a phase shifter, operatively connected to the output of said multiplier circuit for providing a phase shift signal corresponding to the output of said multiplier circuit shifted in phase by 90°;
- a phase detector, operatively connected to said phase shifter and said narrow band filter for synchronously detecting the output of said narrow band filter and said phase shift signal.

8. A circuit for generating a pseudo-error signal according to claim 5, wherein said noise extracting means comprises means for providing a regenerated carrier wave, and a control circuit for generating a phase error voltage which is proportional to the phase difference between the input signal and the regenerated carrier wave.

9. A circuit for generating a pseudo-error signal according to claim 5, wherein said noise extracting means comprises a timing circuit for extracting a timing signal from the input signal and a frequency discriminator circuit, operatively connected to said timing circuit, for extracting a jitter component from said timing signal.

10. A circuit, having an input line to receive an input signal, for generating a pseudo-error signal, comprising:
- a bandpass filter, operatively connected to the input line, for providing a filtered input signal;
- a directional coupler, operatively connected to said bandpass filter, for providing first and second coupled signals;
- a multiplier circuit, operatively connected to said directional coupler for multiplying said first coupled signal to obtain a multiplied signal;
- a narrow bandpass filter, operatively connected to said multiplier circuit, for removing a noise component from said multiplied signal and for providing a narrow filtered signal;
- a limiter circuit, operatively connected to said narrow bandpass filter, for providing a limiter signal;
- a first phase shifter, operatively connected to said multiplier circuit and said narrow bandpass filter, for shifting the phase of said multiplied signal by approximately 90° and for providing a first shifted signal;
- a first phase detector circuit, operatively connected between said limiter circuit and said first phase shifter, for synchronously detecting said limiter signal and said first shifted signal and for providing a detected noise signal;
- a capacitor operatively connected to said phase detector circuit;
- a first low-pass filter operatively connected to said capacitor;
- an attenuator circuit, operatively connected to said first low-pass filter, for magnifying the noise component;
- a demultiplier circuit, operatively connected to said limiter circuit and said phase detector circuit, for demultiplying said limiter signal and for providing a regenerative carrier wave signal;
- a hybrid circuit, operatively connected to said directional coupler, for receiving said second coupled signal and for providing first and second hybrid signals;
- a second phase shifter, operatively connected to said demultiplier circuit, for shifting the phase of said regenerative carrier wave signal by approximately 90°;
- a second phase detector circuit, operatively connected to said hybrid circuit and said demultiplier circuit, for receiving said regenerative carrier wave signal and said second hybrid signal and for providing a first baseband signal;
- a third phase detector, operatively connected to said hybrid circuit and said second phase shifter, for receiving said first hybrid signal and the shifted regenerative carrier wave signal and for providing a second baseband signal;
- a second low-pass filter, operatively connected to said second phase detector, for providing a first filtered baseband signal;
- a first frequency discriminator, operatively connected to said second low-pass filter, for receiving said first filtered baseband signal and for providing a first data signal;
- a third low-pass filter, operatively connected to said third phase detector, for providing a second filtered baseband signal;
- a second frequency discriminator, operatively connected to said third low-pass filter and said first phase discriminator, for providing a second data signal;
- an adder circuit, operatively connected to said second low-pass filter, said first frequency discriminator, and said attenuator circuit, for adding said first filtered baseband signal to said noise component and for providing as an output an added signal;
- a third frequency discriminator, operatively connected to said adder circuit, for receiving said added signal and for providing at its output a discriminator pulse signal;
- an exclusive OR gate, operatively connected to said third frequency discriminator circuit and said first frequency discriminator circuit, for receiving said first data signal and said discriminator pulse signal and for providing a pseudo-error signal when said first data signal does not coincide with said discriminator pulse signal.

11. A circuit, having an input line to receive an input signal, for generating a pseudo-error signal, comprising:
- a multiplier circuit, operatively connected to the input line, for providing a multiplied input signal;
- a first mixer circuit, operatively connected to said multiplier circuit for converting the frequency of said multiplied input signal to a predetermined frequency;
- a bandpass filter operatively connected to said mixer circuit;
- a limiter circuit, operatively connected to said bandpass filter, for providing a limiter signal;
- a demultiplier circuit, operatively connected to said limiter circuit, for providing a demultiplier signal;
- an automatic frequency control circuit, operatively connected to said first mixer circuit, said bandpass filter, said limiter circuit, and said demultiplier circuit, for detecting the difference between the input and the output of said bandpass filter and for providing said first mixer circuit with a control signal;
- a second mixer circuit, operatively connected to said demultiplier circuit and said automatic frequency control circuit, for providing a recovered carrier signal;
- a noise extraction means, operatively connected to said automatic frequency control circuit, for providing a noise signal.

12. A circuit as set forth in claim 11, wherein said noise extracting means comprises a capacitor, operatively connected to said automatic frequency control circuit and a low-pass filter operatively connected to said capacitor.

13. A circuit, having an input line for receiving an input signal, for generating a pseudo-error signal, comprising:
- a four phase detector circuit, operatively connected to the input line, for providing first and second baseband signals;
- a first discriminator circuit, operatively connected to said four phase detector circuit, for receiving said first baseband signal and for providing a first data signal;
- a second discriminator circuit, operatively connected to said four phase detector circuit, for receiving said second baseband signal and for providing a second data signal;
- a recovery circuit, operatively connected to the input line and said four phase detector circuit, for receiving the input signal and for providing a noise component signal and a carrier wave signal; and
- error signal means, operatively connected to said recovery circuit, said four phase detector circuit and said second discriminator circuit, for receiving said noise component signal, said second baseband signal and said second data signal and for providing as an output a pseudo-error signal.

14. A circuit as set forth in claim 13, wherein said recovery circuit comprises:
- a control circuit, operatively connected to the input line, said four phase detector circuit, and said error signal means, for receiving the input signal and for providing as an output a phase voltage signal, said phase voltage signal comprising a phase signal and said noise component signal;
- a low-pass filter, operatively connected to said control circuit and said error signal means, for filtering said noise component signal from said phase voltage signal; and
- a voltage controlled oscillator, operatively connected to said low-pass filter, said four phase detector circuit, and said control circuit for receiving the filtered phase voltage signal and for providing as an output said carrier wave signal.

15. A circuit as set forth in claim 14, wherein said error signal means comprises:
- an amplifier circuit, operatively connected to said control circuit and said low-pass filter, for amplifying said noise component signal;
- an adder circuit, operatively connected to said four phase detector circuit, said second discriminator circuit, and said amplifier circuit, for adding said amplified noise component signal and said second baseband signal and for providing as an output an added signal;
- a third discriminator circuit, operatively connected to said adder circuit, for receiving said added signal and for providing a discriminator pulse signal; and
- an exclusive OR gate, operatively connected to said second discriminator circuit and said third discriminator circuit, for providing a pseudo-error signal when said second data signal and said discriminator pulse signal do not coincide.

16. A circuit as set forth in claim 13, wherein said error signal means comprises:
- an amplifier circuit, operatively connected to said recovery circuit, for amplifying said noise component signal;
- an adder circuit, operatively connected to said amplifier circuit, said four phase detector circuit, and said second discriminator circuit, for adding said amplified noise component signal and said second baseband signal and for providing as an output an added signal;
- a third discriminator circuit, operatively connected to said adder circuit, for receiving said added signal and for providing a discriminator pulse signal; and
- an exclusive OR gate, operatively connected to said third discriminator circuit and said second discriminator circuit, for providing a pulse error signal when said second data signal and said discriminator pulse signal do not coincide.

17. A circuit, having an input line for receiving an input signal, for generating a pseudo-error signal, comprising:
- a four phase detector circuit, operatively connected to the input line, for providing first and second baseband signals;
- a first discriminator circuit, operatively connected to said four phase detector circuit, for receiving said first baseband signal and for providing a first data signal;
- a second discriminator circuit, operatively connected to said four phase detector circuit, for receiving said second baseband signal and for providing a second data signal;
- a recovery circuit, operatively connected to the input line and said four phase detector circuit, for receiving the input signal and for providing a noise component signal and a carrier wave signal; and error signal means, operatively connected to the input line, said four phase detector circuit and said second discriminator circuit, for receiving the input signal, said second baseband signal and said second data signal and for providing as an output a pseudo-error signal.

18. A circuit as set forth in claim 17, wherein said error signal means comprises:
- a timing circuit, operatively connected to the input line for extracting a timing signal from the input signal;
- a tunk circuit, operatively connected to said timing circuit, for providing a filtered timing signal;
- a frequency discriminator circuit, operatively connected to said tunk circuit, for providing a jitter component signal;
- an amplifier circuit, operatively connected to said frequency discriminator circuit, for amplifying said jitter component signal;
- an adder circuit, operatively connected to said amplifier circuit, said four phase detector circuit, and said second discriminator circuit, for adding said second baseband signal to said jitter component signal and for providing an added signal;
- a fourth discriminator circuit, operatively connected to said tunk circuit and said adder circuit, for providing a discriminator pulse signal; and
- an exclusive OR gate, operatively connected to said second discriminator circuit and said third discriminator circuit, for providing a pseudo-error signal when said second data signal and said discriminator pulse signal do not coincide.

19. A circuit as set forth in claim 17, wherein said error signal means comprises:
- a timing circuit, operatively connected to the input line, for providing a timing signal;
- a phase detector circuit, operatively connected to said timing circuit, for providing a phase difference signal;
- a loop filter, operatively connected to said phase detector, for filtering said phase difference signal;
- a voltage controlled oscillator, operatively connected to said loop filter and said phase detector circuit, for receiving said filtered phase difference signal and for providing a controlled timing signal to said phase detector circuit;
- an amplifier circuit, operatively connected to said phase detector circuit and said loop filter, for receiving said phase difference signal and for providing a first noise signal by amplifying the noise component of said phase difference signal;
- an adder circuit, operatively connected to said amplifier circuit, said four phase detector circuit, and said second discriminator circuit, for adding said second baseband signal to said first noise signal and for providing as an output an added signal;
- a third discriminator circuit, operatively connected to said adder circuit and said voltage controlled oscillator, for receiving said added signal and for providing a discriminator pulse signal; and
- an exclusive OR gate, operatively connected to said second discriminator circuit and said third discriminator circuit, for providing a pseudo-error signal when said second data signal and said discriminator pulse signal do not coincide.

* * * * *

UNITED STATES PATENT AND TRADEMARK OFFICE
CERTIFICATE OF CORRECTION

PATENT NO. : 4,247,938  Page 1 of 2
DATED : January 27, 1981
INVENTOR(S) : Hiroshi Kurihara et al It is certified that error appears in the above—identified patent and that said Letters Patent is hereby corrected as shown below:

Front page, [57] Abstract, line 12, ", and;" should be ", and".
Column 1, line 26, "effect" should be --affect--.
Column 2, line 16, "demodulator" should be --demodulated--.
Column 2, line 29, "can not" should be --cannot--.
Column 2, line 34, "can not" should be --cannot--.
Column 2, line 45, "base band" should be --baseband--.
Column 2, line 48, "base band" should be --baseband--.
Column 4, line 22, delete "that".
Column 4, line 64, "base band" should be --baseband--.
Column 5, line 18, "effect" should be --affect--.
Column 5, line 40, ", (e)" should be --(e),--.
Column 5, line 65, "+5°" should be --±5°--.
Column 6, line 18, "concides" should be --coincides--.
Column 6, line 54, "trafic" should be --traffic--.
Column 7, line 15, "base band" should be --baseband--; "trafic" should be --traffic--.
Column 7, line 17, "base band" should be --baseband--; after "added" insert --to--.
Column 7, line 45, "base band" should be --baseband--.
Column 7, line 68, "numerals" should be --numeral--.

UNITED STATES PATENT AND TRADEMARK OFFICE
CERTIFICATE OF CORRECTION

PATENT NO. : 4,247,938            Page 2 of 2

DATED : January 27, 1981

INVENTOR(S) : Hiroshi Kurihara et al

It is certified that error appears in the above—identified patent and that said Letters Patent is hereby corrected as shown below:

```
Column 8, line 5, "tunk" should be --tank--.
Column 8, line 37, "pseduo-error" should be --pseudo-error--.
Column 13, line 12, "tunk" should be --tank--.
Column 13, line 15, "tunk" should be --tank--.
Column 13, line 26, "tunk" should be --tank--.
```

Signed and Sealed this

Fifth Day of January 1982

[SEAL]

*Attest:*

*Attesting Officer*

GERALD J. MOSSINGHOFF

*Commissioner of Patents and Trademarks*